United States Patent [19]

Fischer et al.

[11] Patent Number: 5,367,029
[45] Date of Patent: Nov. 22, 1994

[54] THERMOPLASTIC MOLDING MATERIAL

[75] Inventors: Wolfgang Fischer, Ludwigshafen; Norbert Guentherberg, Speyer; Norbert Niessner, Friedelsheim, all of Germany

[73] Assignee: BASF Aktiengesellschaft, Ludwigshafen, Germany

[21] Appl. No.: 136,932

[22] Filed: Oct. 18, 1993

[30] Foreign Application Priority Data

Oct. 24, 1992 [DE] Germany .............................. 4235976

[51] Int. Cl.⁵ .................. C08F 265/04; C08F 265/06; C08F 279/02
[52] U.S. Cl. .................... 525/301; 525/279; 525/281; 525/289; 525/293; 525/303; 525/308; 525/309; 525/310; 525/316
[58] Field of Search ............... 525/279, 281, 289, 293, 525/301, 303, 308, 309, 310, 316

[56] References Cited

U.S. PATENT DOCUMENTS

| | | | |
|---|---|---|---|
| 3,055,859 | 9/1962 | Vollmert. | |
| 4,634,734 | 1/1987 | Hambrecht et al. | 525/85 |
| 4,788,253 | 11/1988 | Hambrecht et al. | 525/83 |
| 5,011,871 | 4/1991 | Bueschl et al. | 523/436 |
| 5,120,788 | 6/1992 | Seitz et al. | 525/85 |
| 5,252,666 | 10/1993 | Seitz et al. | 525/80 |

FOREIGN PATENT DOCUMENTS

| | | |
|---|---|---|
| 445601 | 9/1991 | European Pat. Off. . |
| 450511 | 10/1991 | European Pat. Off. . |
| 494534 | 7/1992 | European Pat. Off. . |
| 1260135 | 11/1968 | Germany . |
| 4011163 | 10/1991 | Germany . |
| 1124911 | 8/1968 | United Kingdom . |

Primary Examiner—Vasu S. Jagannathan
Attorney, Agent, or Firm—Keil & Weinkauf

[57] ABSTRACT

Particulate graft copolymers for matt thermoplastic molding materials contain a base and a graft sheath. The base contains 75 to 99.8% of at least one alkyl acrylate, from 0.1 to 5% of at least one polyfunctional, crosslinking monomer having at least two ethylenic double bonds which are not conjugated in the 1,3-position, and from 0.1 to 20% of at least one ethylenically unsaturated monomer having one or more acidic groups. Alternatively, the base may contain at least 50% of one or more dienes, up to 50% of at least one further ethylenically unsaturated monomer, and up to 15% of at least one ethylenically unsaturated monomer having one or more acidic groups. The sheath contains from 0 to 99.8% of at least one aromatic vinyl monomer, from 0 to 99.8% of at least one polar, copolymerizable, ethylenically unsaturated monomer, from 0.1 to 20% of at least one ethylenically unsaturated monomer having one or more basic groups, and from 0.1 to 10% of at least one hydroxyalkyl (meth)acrylate. All percentages are by weight.

1 Claim, No Drawings

THERMOPLASTIC MOLDING MATERIAL

BACKGROUND OF THE INVENTION

The present invention relates to particulate graft copolymers and also to matt thermoplastic molding materials having improved toughness prepared from the latter.

The preparation of particulate graft copolymers composed of a rubber-elastic core, i.e. a polymer having a glass transition temperature of below 0° C., and a graft sheath is known. For this purpose a grafting base is first of all prepared, for example by emulsion polymerization of suitable monomers. The monomers that are to form the graft sheath are then polymerized in the presence of the grafting base so that as high a proportion as possible is grafted onto the grafting base. The particulate graft copolymers are used to improve the impact resistance of intrinsically brittle, impact-sensitive thermoplastics. The monomers for the graft sheath are selected so that the polymers formed therefrom are compatible with the thermoplastics to be modified. The preparation of impact modifiers has been known for a long time and is described for example in U.S. Pat. No. 3,055,859 and in DE-C 1,260,136.

A main problem in the preparation of such particulate graft copolymers is the bonding of the graft sheath to the grafting base. If the bonding is poor the impact-modifying action is not sufficient, with the result that only products having a reduced toughness can be obtained. A number of measures have been proposed to improve the bonding. DE 4,011,163 describes an improvement of the bonding if, as the grafting base, a polymer is used that contains an acidic group-containing monomer incorporated by polymerization and onto which is grafted a basic group-containing monomer as the graft sheath. As a further possibility EP 0,445,601 describes the use of hydroxyalkyl acrylate or hydroxyalkyl methacrylate in the grafting base.

We have found that the bonding of the graft sheath to the grafting base can be substantially improved if, in addition to the acidic monomers in the grafting base and the basic monomers in the graft sheath, from 0.1 to 10% by weight of a hydroxyalkyl acrylate or hydroxyalkyl methacrylate is incorporated by polymerization into the graft sheath. It is believed (though this is not intended to restrict the invention) that ester bonds are formed, which result in a better bonding of the graft sheath to the grafting base and thus to an improvement in the toughness. Molding materials having the graft rubber according to the invention result in matt products having a very good toughness; the graft rubbers thus also serve as flatting agents.

The immediate subject of the invention is a particulate graft copolymer comprising a grafting base A of, based on A, A11: from 75 to 99.8% by weight of at least one alkyl acrylate A11 having 1-8 carbon atoms in the alkyl radical, A12: from 0.1 to 5% by weight of at least one polyfunctional, crosslinking monomer A12, A13: from 0.1 to 20% by weight of at least one monomer A13 having one or more acidic groups or A111: at least 50% by weight of one or more dienes A111, A112: up to 50% by weight of at least one further ethylenically unsaturated monomer A112, A113: up to 15% by weight of at least one monomer A113 having one or more acidic groups and a graft sheath B grafted thereon, comprising, based on B, B1: from 0 to 99.8% by weight of at least one aromatic vinyl monomer B1, B2: from 0 to 99.8% by weight of at least one polar, copolymerizable, ethylenically unsaturated monomer B2, B3: from 0.1 to 20% by weight of at least one monomer B3 having one or more basic groups, and B4: from 0.1 to 10% by weight of at least one hydroxyalkyl acrylate or hydroxyalkyl methacrylate B4.

The invention furthermore relates to a molding material that essentially comprises from 1 to 50% by weight of the aforementioned particulate graft copolymer and from 50 to 99% by weight of at least one polymer having a glass transition temperature of more than 25° C. as matrix and that generally also includes minor amounts of conventional additives and auxiliaries.

The graft copolymer is built up, for example, from

| A: | 30–80% by weight |
| --- | --- |
| preferably | 35–80% by weight |
| particularly preferably | 35–75% by weight (based on A + B) |
| A11: | 75–99.8% by weight |
| preferably | 80–99.7% by weight |
| particularly preferably | 85–99.7% by weight (based on A) |
| A12: | 0.1–5.0% by weight |
| preferably | 0.1–4.5% by weight |
| particularly preferably | 0.1–4.0% by weight (based on A) |
| A13: | 0.1–20.0% by weight |
| preferably | 0.2–15.5% by weight |
| particularly preferably | 0.2–11.0% by weight (based on A) |
| A111: | at least 50% by weight |
| preferably | at least 75% by weight |
| particularly preferably | at least 92% by weight (based on A) |
| A112 | 0–50% by weight |
| preferably | 0–25% by weight |
| particularly preferably | 0% by weight (based on A) |
| A113 | 0–15% by weight |
| preferably | 0.2–10% by weight |
| particularly preferably | 0.2–8% by weight (based on A) |
| B: | 20–70% by weight |
| preferably | 20–65% by weight |
| particularly preferably | 25–65% by weight (based on A + B) |
| B1 | 0–99.8% by weight |
| preferably | 0–99.7% by weight |
| particularly preferably | 0–99.5% by weight (based on B) |
| B2 | 0–99.8% by weight |
| preferably | 0–99.5% by weight |
| particularly preferably | 0–99.0% by weight (based on B) |
| B1 + B2 | 60–99.8% by weight |
| preferably | 70–99.5% by weight |
| particularly preferably | 85–99.0% by weight (based on B) |
| B3 | 0.1–20% by weight |
| preferably | 0.25–15% by weight |
| particularly preferably | 0.5–7.5% by weight (based on B) |
| B4 | 0.1–20% by weight |
| preferably | 0.25–15% by weight |
| particularly preferably | 0.5–7.5% by weight (based on B) |

A suitable process for preparing molding materials having matt surfaces furthermore comprises adding from 1 to 50% by weight of the particulate graft copolymer according to the invention to impact-modified thermoplastics, for example ABS, ASA, impact-resistant polymethyl methacrylate, impact-resistant polystyrene (HIPS), polycarbonate/ABS, polycarbonate/ASA, polyphenylene ether/HIPS, impact-resistant PVC, and also their mixtures with one another.

In principle the particulate graft copolymers according to the invention are also suitable for flatting for example the class of polycarbonates, polyester carbonates, polyesters, polyamides, polyphenylene ethers, polyether ketones, polyether sulfones, polysulfones, polyoxyalkylenes, polyaryl sulfides and also their mixtures with one another.

The subject of the present invention are thus particulate graft copolymers of the above, preparation-conditioned composition and also thermoplastic molding materials prepared using such graft copolymers. The following details can be given concerning the particulate graft copolymers according to the invention, their constituents, and their preparation:

The particulate graft copolymers are obtained in a manner known per se from a grafting base (rubber) A and a graft sheath B. The rubber A is either a crosslinked acrylate polymer or a diene copolymer having a glass transition temperature of below 0° C., preferably below −20° C.

Suitable as monomer A11 are acrylates having 1–8 carbon atoms, at least in some cases those having 4–8 carbon atoms, in the alkyl radical. Suitable monomers that may particularly be mentioned are n-butyl acrylate and ethylhexyl acrylate. The acrylates may in each case be used alone or mixed with one another.

In order to achieve good mechanical properties it has proved necessary for the acrylate polymer used as grafting base to be crosslinked. To this end the polymerization of the acrylates is carried out in the presence of from 0.1 to 5% by weight, based on the total weight of the monomers used in the preparation of the grafting base, of a copolymerizable, polyfunctional monomer A12 effecting the crosslinking. Suitable monomers are those having at least two ethylenic double bonds capable of participating in the copolymerization, but which are not conjugated in the 1,3-position. Examples include divinylbenzene, diallyl maleate, diallyl fumarate, diallyl phthalate, allyl methacrylate, triallyl cyanurate or triallyl isocyanurate. A particularly suitable crosslinking monomer has proved to be the acrylic acid ester of tricyclodecenyl alcohol (cf. DE-C 1,260,135).

In order to improve the bonding of the graft sheath to the grafting base, the monomer mixture used for the preparation of the grafting base also comprises from 0.1 to 20% by weight of one or more copolymerizable monomers (A13) or (A113) having one or more acidic groups. Suitable acidic groups are in particular carboxylic acid, sulfonic acid or phosphoric acid groups. Preferred acidic monomers are $\alpha,\beta$-unsaturated carboxylic acids such as acrylic acid or methacrylic acid, and also citraconic acid, crotonic acid, fumaric acid, itaconic acid, maleic acid, vinylsulfonic acid, vinylbenzenesulfonic acid, vinylphosphoric acids or cinnamic acid.

The preparation of the graft copolymer can be performed according to the method described in DE-C 1,260,135. To this end the grafting base A is first of all prepared; if the grafting base is to be an acrylate rubber, the acrylic acid ester or esters A11, the polyfunctional monomer A12, and the acidic monomer A13 according to the invention are polymerized in aqueous emulsion at from 20° to 100° C., preferably from 50° to 80° C. Conventional emulsifiers may be used, such as the alkali metal salts of alkylsulfonic or alkylarylsulfonic acids, alkylsulfates, fatty alcohol sulfonates, salts of higher fatty acids having 10–30 carbon atoms, or resin soaps.

Preference is given to the sodium salts of alkanesulfonates or of fatty acids having 10–18 carbon atoms. The emulsifiers are conveniently used in an amount of from 0.5 to 5% by weight, in particular from 1 to 2 by weight, based on the total weight of the monomers used for the preparation of the grafting base. In general a water/monomer ratio of from 2:1 to 0.7:1 is employed. Suitable polymerization initiators are in particular the customary persulfates, for example potassium peroxodisulfate; however, redox systems are also suitable. The amount of initiators (e.g. from 0.1 to 1% by weight, based on the total weight of the monomers) is governed in a known manner by the desired molecular weight.

Polymerization auxiliaries that may be used include the conventional buffer substances, e.g. sodium bicarbonate and sodium pyrophosphate, by means of which the pH may preferably be adjusted to 6–9, and also up to 3% by weight of a molecular weight regulator such as mercaptan, terpinol, or dimeric alpha-methylstyrene.

The exact polymerization conditions, in particular the nature, metering, and amount of the emulsifier are determined within the aforementioned ranges so that the resultant latex of the crosslinked acrylate polymer has a $d_{50}$ value in the range from about 30 to 1000 nm, preferably in the range from 50 to 800 nm.

If the graft core is to be a diene rubber, the following procedure is conveniently adopted: the elastomer, i.e. the grafting base A, is prepared by polymerizing A111 alone, if desired together with the further comonomers, in aqueous emulsion in a manner known per se at from 20° to 100° C., preferably from 50° to 80° C. Conventional emulsifiers may be used, such as alkali metal salts of alkylsulfonic or alkylarylsulfonic acids, alkylsulfates, fatty alcohol sulfonates, salts of higher fatty acids having 10–30 carbon atoms, or resin soaps. Preference is given to the sodium or potassium salts of alkanesulfonates or fatty acids having 10–18 carbon atoms. The emulsifiers are conveniently used in amounts of from 0.5 to 5% by weight, in particular from 0.5 to 2% by weight, based on the monomers used in the preparation of the grafting base A. In general a water/monomer ratio of from 2:1 to 0.7:1 is employed. Polymerization initiators that may in particular be used are the conventional persulfates such as potassium persulfate, though redox systems may also be employed. The initiators are generally employed in amounts of from 0.1 to 1% by weight, based on the monomers used in the preparation of the grafting base A. Further polymerization auxiliaries that may be used include the conventional buffer substances, for example sodium bicarbonate and sodium pyrophosphate, by means of which the pH can be adjusted to preferably 6–9; furthermore, in general from 0.1 to 3% by weight of a molecular weight regulator such as mercaptans, terpinols or dimeric $\alpha$-methyl styrene may be used in the polymerization.

The exact polymerization conditions, especially the nature, metering and amount of the emulsifier, are in particular chosen within the above-specified ranges so that the resultant latex of the polymer A has a $d_{50}$ value in the range from about 100 to 750 nm, preferably in the range from 100 to 600 nm. Alternatively, the emulsion polymer having median particle sizes in the range from 60 to 150 nm is agglomerated in a known manner (cf. DE-B 2,427,960).

In order to apply the graft sheath B, i.e. to prepare the graft copolymer from the core and graft sheath, a monomer mixture comprising up to 99.8% by weight of at least one aromatic vinyl monomer B1, and/or up to 99.8% by weight of at least one polar, copolymerizable monomer B2 and from 0.1 to 20% by weight of at least one basic monomer B3 is polymerized in the presence of the resultant latex A. Examples of aromatic vinyl monomers include styrene, alpha-methylstyrene and nuclear-alkylated styrenes such as p-methylstyrene and tert-butylstyrene. Particularly preferred are styrene, alpha-methylstyrene and p-methylstyrene. Examples of polar, copolymerizable, ethylenically unsaturated monomers B2 are acrylonitrile, methacrylonitrile, alkylacrylates and alkylmethacrylates having 1–4 carbon atoms in the alkyl radical. Preference is given to acrylonitrile, methylmethacrylate and mixtures thereof. Suitable monomers B3 are monomers copolymerizable with B1 and B2 and having one or more basic groups. Preferred monomers include a tertiary amino group in the molecule. The following are mentioned here by way of example: dimethylaminoethyl (meth)acrylate, morpholine methacrylate, N-vinylimidazole, p-dimethylamino styrene, N-vinylcarbazole, N-vinylindole, N-vinylpyrrole, 4-vinylpyrimidine, 2-vinylpyridine, 3-vinylpyridine, 4-vinylpyridine and also their mixtures. Particularly preferred monomers are esters of acrylic acid or methacrylic acid with aliphatic alcohols that have a tertiary amino group in the alkyl radical.

In order to improve the bonding of the graft sheath to the grafting base, the monomer mixture used for the preparation of the graft sheath also contains, in accordance with the invention, from 0.1 to 10% by weight, preferably from 0.5 to 5% by weight, of one or more hydroxyalkyl acrylates or hydroxyalkyl methacrylates B4. Suitable hydroxyalkyl acrylates or hydroxyalkyl methacrylates are esters of acrylic acid or methacrylic acid with polyhydric alcohols. Particularly preferred hydroxyalkyl acrylates have 2–6 carbon atoms in the alkyl radical, for example 2-hydroxyethyl acrylate, 2-hydroxyethyl methacrylate and 4-hydroxybutyl acrylate.

It is advantageous to carry out the graft copolymerization onto the polymer serving as grafting base A again in aqueous emulsion. The copolymerization may be carried out in the same system as the polymerization of the grafting base and further emulsifier and initiator can be added. These however need not be identical to the emulsifiers and initiators used in the preparation of the grafting base A. Thus, it may for example be expedient to use a persulfate as initiator for the preparation of the grafting base A, but to use a redox initiator system for the polymerization of the graft sheath B. The comments made above regarding the preparation of the grafting base A also apply to the choice of emulsifier, initiator and polymerization auxiliaries. The monomer mixture to be grafted on can be added to the reaction mixture all at one time, in batches in several stages or, preferably, continuously during the polymerization. The graft copolymerization is controlled so as to achieve a degree of grafting of from 10 to 60% by weight, preferably from 15 to 45% by weight.

The particulate graft copolymers according to the invention may be used as such alone as molding materials. For this purpose they may be worked up for example by spray drying. However, the particulate graft copolymers are preferably used for mixing with a thermoplastic in order to improve its impact resistance. Suitable thermoplastics for modification purposes have glass transition temperatures of above 25° C., preferably above 60° C., and hereinafter are also termed hard component (matrix). Examples of suitable hard components are polyvinyl chloride, polymethyl methacrylate and also, in particular, copolymers of an aromatic vinyl monomer and a polar, copolymerizable, ethylenically unsaturated monomer. Suitable aromatic vinyl monomers and also polar, copolymerizable, ethylenically unsaturated monomers are also here the compounds named as B1 and B2 in the preparation of the graft sheath. Particularly preferred hard components are styrene-acrylonitrile and alpha-methylstyrene-acrylonitrile copolymers. The incorporation of the particulate graft copolymers according to the invention may be effected for example by isolating the particulate graft copolymer from the emulsion by adding an electrolyte, dewatering it, and mixing it with the hard component by joint extrusion, kneading or rolling.

The thermoplastic molding materials according to the invention may include as further constituents additives such as are conventionally used for thermoplastic molding materials. Additives that may be mentioned by way of example are: fillers, further compatible plastics, antistatics, antioxidants, fleeproofing agents, lubricants, dyes and pigments. The additives are used in conventional amounts, preferably in amounts of up to 30% by weight, based on the total weight of the thermoplastic molding material. Compatible plastics may also be present in a higher proportion.

The molding materials according to the invention can be processed according to methods conventionally used for thermoplastics processing, for example extrusion and injection molding, into a very wide range of moldings, for example window profiles, garden furniture, boats, nameplates, household articles, lamp covers, automobile parts and children's toys. The materials according to the invention are particularly suitable for producing moldings in which a high impact resistance is required.

Parts and percentages are by weight.

EXAMPLES

1. Preparation of the grafting base A
a) The respective acrylate-based grafting base (A11, A12, A13) was prepared by the following general procedure:
   160 g of the monomer mixtures specified in Table 1 for the preparation of the grafting base A were heated at 60° C. in 1500 g of water while stirring, with the addition of 5 g of the sodium salt of $C_{12}$–$C_{18}$-paraffinsulfonic acid, 3 g of potassium peroxodisulfate, 3 g of sodium hydrogen carbonate and 1.5 g of sodium pyrophosphate. 10 minutes after the start of the polymerization reaction a further 840 g of the mixture specified in Table 1 were added within 3 hours. After the completion of the monomer addition the emulsion was kept for a further hour at 60° C.
b) The respective butadiene-based grafting base (A111, A112, A113) was prepared by the following procedure:
   A polybutadiene latex was prepared by polymerizing at 65° C. 600 g of butadiene or the mixture A specified in Table 2 of the grafting base in the presence of a solution of 6 g of tert-dodecylmercaptan, 7 g of the sodium salt of a $C_{14}$-alkanesulfonate as emulsifier, 2 g of potassium peroxodisulfate and 2 g of sodium pyrophosphate in 800 ml of water. The conversion was 98%. A latex was obtained whose median particle size is 100 nm. The latex obtained was agglomerated by adding 25 g of an emulsion of a copolymer comprising 96 parts of ethyl acrylate and 4 parts of methacrylamide having a solids content of 10% by weight, a polybutadiene latex having a median particle size of 350 nm being formed.

HEA = 2-Hydroxyethyl acrylate
S = Styrene
AN = Acrylonitrile
MAA = Methacrylic acid

TABLE 2

| Grafting Base A[1] | | Graft Sheath B[2] | | | | Notched impact strength [kJ/m$^2$] | Gloss[3] |
|---|---|---|---|---|---|---|---|
| | BU | MAA | S | AN | DMAEA | | |
| 2 | 99 | 1 | 68 | 30 | 1 | 1 HEA | 21 | 12 |
| 3 | 99 | 1 | 68 | 30 | 1 | 1 BDA1 | 22 | 10 |
| C[4] | 99 | 1 | 69 | 30 | 1 | — | 18 | 8 |

[1]Composition of the monomer mixture used to prepare the grafting base A
[2]Composition of the monomer mixture used to prepare the graft sheath B
[3]45° Gloss
[4]Comparative experiment corresponding to the prior art 2. Preparation of the particulate graft copolymers 2100 g of the emulsion prepared according to the above procedure (1a) were mixed with 1150 g of water and 2.7 g of potassium peroxodisulfate and heated at 65° C. while stirring. After the reaction temperature was reached 560 g of the monomer mixture specified in Table 1 for the preparation of the graft sheath B were metered in over the course of 3 hours. After the end of the addition the emulsion was heated for a further 2 hours at 65° C. The graft copolymer was precipitated from the emulsion at 95° C. by means of calcium chloride solution, washed with water, and dried in a warm current of air.

After adding 400 g of water, 4 g of the sodium salt of a C$_{14}$-alkanesulfonate and 2 g of potassium peroxodisulfate to the grafting base prepared according to the above procedure (1b), 400 g of the mixture of the graft monomers were introduced in the ratios specified in Table 2 within 4 hours. The polymerization was performed while stirring the batch at 75° C. The conversion is practically quantitative referred to styrene-acrylonitrile. The graft rubber dispersion obtained was precipitated by means of magnesium sulfate solution and the separated graft copolymer was washed with distilled water and dried.

3. Mixing with the hard component (matrix)

To prepare the mixtures, a styrene/acrylonitrile copolymer having an acrylonitrile content of 35% and a viscosity number of 80 ml/g was used as hard component. The precipitated and dried graft copolymer from (2) was mixed in an extruder at 260° C. with in each case so much material of the hard component that the resulting mixture had a graft copolymer fraction of 50% and 46%. Molded parts were produced from this mixture by injection molding.

TABLE 1

| Grafting Base A[1] | | | Graft Sheath B[2] | | | | Notched impact strength [kJ/m$^2$] | Gloss[3] |
|---|---|---|---|---|---|---|---|---|
| | BA | DCPA | MAA | S | AN | DMAEA | | |
| 1 | 97 | 1 | 2 | 73 | 23 | 3 | 1 HEA | 28 | 6 |
| 2 | 97 | 1 | 2 | 73 | 23 | 3 | 1 BDA1 | 29 | 7 |
| C[4] | 97 | 1 | 2 | 73 | 24 | 3 | — | 25 | 10 |

[1]Composition of the monomer mixture used to prepare the grafting base A
[2]Composition of the monomer mixture used to prepare the graft sheath B
[3]45° Gloss
[4]Comparative experiment corresponding to the prior art BA = Butyl acrylate
BDA1 = 4-Hydroxybutyl acrylate
DCPA = Acrylic acid ester of tricyclodecenyl alcohol
DMAEA = Dimethylaminoethyl acrylate
BU = Butadiene
BDA1 = 4-Hydroxybutyl acrylate
DMAEA = Dimethylaminoethyl acrylate
HEA = 2-Hydroxyethyl acrylate
S = Styrene
AN = Acrylonitrile
MAA = Methacrylic acid.

We claim:

1. A particulate graft copolymer comprising a grafting base A consisting essentially of, based on A, A11: from 75 to 99.8% by weight of at least one alkyl acrylate A11 having 1–8 carbon atoms in the alkyl radical, A12: from 0.1 to 5% by weight of at least one polypolyfunctional, crosslinking copolymerizable monomer A12 having at least two ethylenic double bonds which are conjugated in the 1,3-position, and A13: from 0.1 to 20% by weight of at least one ethylenically unsaturated monomer A13 having one or more acidic groups or A111: at least 50% by weight of one or more dienes A111, A112: up to 50% by weight of at least one further ethylenically unsaturated monomer A112, and A113: from 0.1 to 20% by weight of at least one ethylenically unsaturated monomer A113 having one or more acidic groups and a graft sheath B grafted thereon, comprising, based on B, B1: from 0 to 99.8% by weight of at least one aromatic vinyl monomer B1, B2: from 0 to 99.8% by weight of at least one polar, copolymerizable, ethylenically unsaturated monomer B2, B3: from 0.1 to 20% by weight of at least one ethylenically unsaturated monomer B3 having one or more basic groups, and B4: from 0.1 to 10% by weight of at least one hydroxyalkyl acrylate or hydroxyalkyl methacrylate B4.

* * * * *